UNITED STATES PATENT OFFICE.

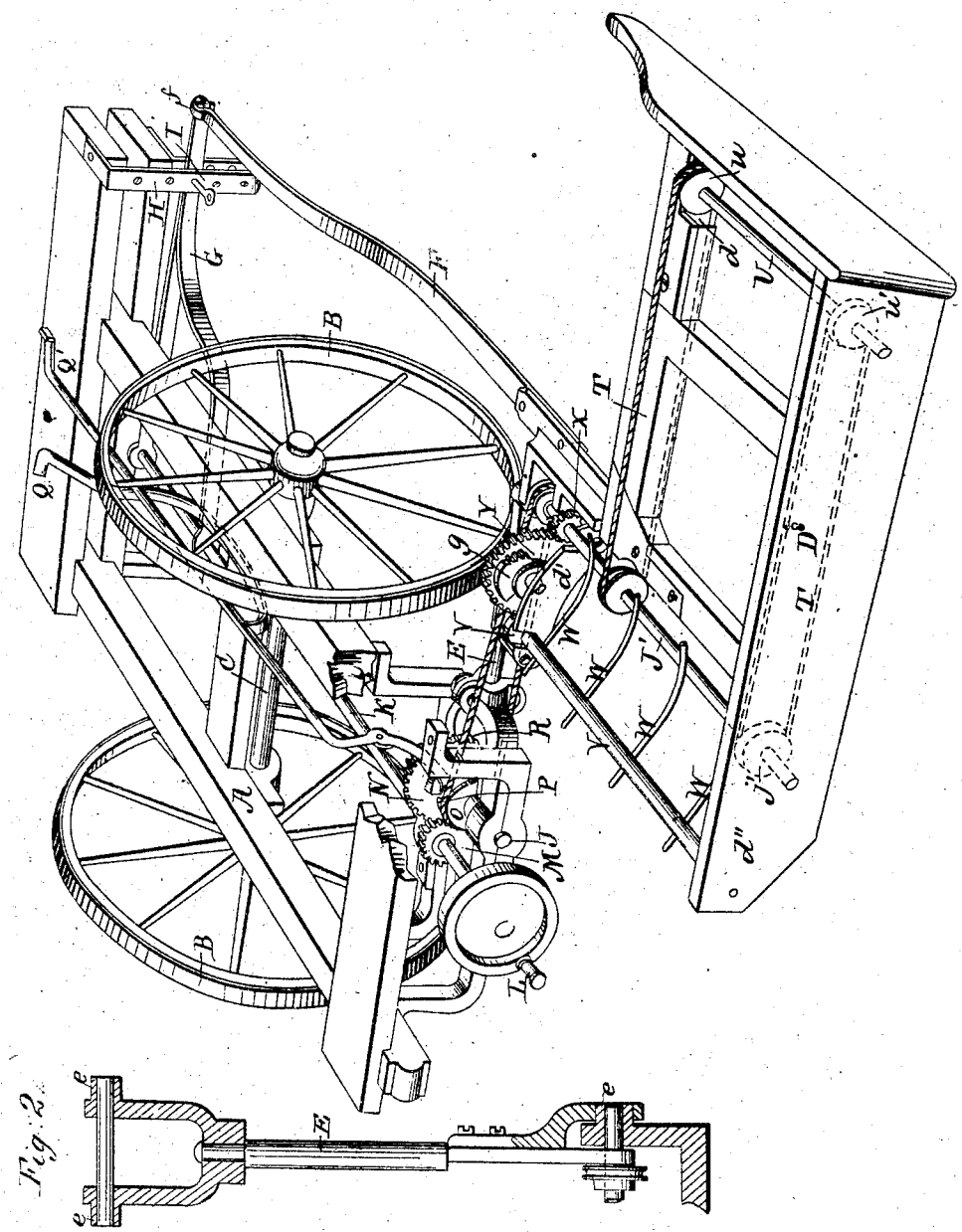

ROBERT D. BROWN, OF COVINGTON, INDIANA.

IMPROVEMENT IN HARVESTERS.

Specification forming part of Letters Patent No. 41,477, dated February 9, 1864.

*To all whom it may concern:*

Be it known that I, ROBERT D. BROWN, of Covington, Fountain county, Indiana, have invented a new and useful Improvement in Harvesting-Machines; and I do hereby declare the following to be a full, clear, and exact description thereof, reference being had to the accompanying drawing, making part of this specification.

My invention relates to devices for enabling the employment of a self raking and gaveling apparatus, in connection with a floating platform and sickle.

Figure 1 is a perspective view of my improvement, together with portions of a harvester immediately connected therewith. Fig. 2 is a top view of my swiveled coupling-rod.

The main frame A is supported on customary ground-wheels, B B', from whose axle C the various operative parts may derive their motion in any approved way.

D is the platform-frame, connected to the main frame by means of swiveled coupling-rod E and drag-bar F. The drag-bar F projects rigidly forward from the platform-frame, and engages by means of a hook, $f$, in the outer extremity of an arm, G, which at its other extremity is hinged to the main frame. A perforated bracket, H, attached to the main frame, and a bolt, I, enable the arm G to be set at a greater or less elevation. The connection of the rod E to the main and platform frames respectively is made by means of gimbal or universal joints, in manner substantially as follows:

$e$ and $e'$ are sleeves which embrace shafts J and J', journaled in the main and platform frames, respectively. The shaft K of the crank L, which operates the sickle-pitman, may derive motion from the main axle C in the usual way. Affixed to the shaft K is a pinion, M, which gears into a spur-wheel, N, on the shaft $y$.

Upon the shaft J is a sliding pulley, O, which can be coupled with the wheel N by means of a clutch, P. Treadles Q Q' enable the clutching and unclutching of the pulley O. The pulley O communicates by chain or band R with a pulley, S, which is fast to the shaft J', journaled at the inner end of the platform.

The removal of the grain from the platform may be accomplished by a continuously-revolving rake, substantially such as described in Letters Patent granted to me on the 7th day of April, 1863. The endless rake is attached to and carried around by belts or chains T T', stretched around pulleys $jj$ on the shaft J at the inner end of the platform and pulleys $u u$ on the shaft U at the outer end of the platform. A jog, $d$, in the rear edge of the finger-beam enables the pulley $u$ to be placed so far forward as to bring the rake close behind the sickle. Prolongations $d'$ $d''$ of the inner end of the platform-frame carry the shaft V of my intermittent cradle V W. The forward end of the shaft V carries pinion $v$. A pinion, X, upon the shaft J meshes with a wheel, Y, which carries a cogged cam, $y$, which at each rotation of the wheel Y meshes in the pinion $v$ and uptips the cradle.

In arranging the endless rake and intermittent cradle care is required that the instant of uptipping of the cradle shall occur just as one tier of rake-teeth has delivered its load and before the next following tier has come forward, so that no grain may be spilled upon the ground during the lift of the cradle.

I claim herein as new and of my invention—

1. The mode, substantially as described, of connecting the platform to the main frame by the swiveled coupling-rod E, sleeves $e e'$, and shafts J and J', whereby motion can be communicated to the rakeson a perfectly-floating platform without affecting the continuity of the raking motion or straining the parts.

2. In the described combination with a floating platform, endless rake, and swiveled coupling, the chain R and pulleys O and S, or equivalent flexible device for transmitting motion to the raking mechanism, as set forth.

3. In the described combination with a swiveled coupling, E $e e'$ J J', the device for varying the pitch of the cutting apparatus, consisting of the drag-bar F $f$, bracket H, arm G, and pin I, or their equivalents.

4. The arrangement of the outer and forward endless rake-pulley $u$ within a recess, $d$, in the rear edge of the finger-bar, so as to bring the front edge of the endless rake within working distance of the sickle.

5. The arrangement of shafts K and J, gear-wheels M and N, sliding pulley O, clutch P, and treadles Q Q', as and for the purpose specified.

In testimony of which invention I hereunto set my hand.

ROBERT D. BROWN.

Witnesses:
GEO. H. KNIGHT,
CHARLES L. FISHER.